United States Patent
Kim et al.

(10) Patent No.: US 11,147,086 B2
(45) Date of Patent: Oct. 12, 2021

(54) ELECTRONIC DEVICE FOR PREVENTING PACKET DROP FOR UPLINK TRANSMISSION

(71) Applicant: Samsung Electronics Co., Ltd., Gyeonggi-do (KR)

(72) Inventors: Jihwan Kim, Gyeonggi-do (KR); Kyunghoon Lee, Gyeonggi-do (KR); Soomin Lee, Gyeonggi-do (KR); Hyejeong Kim, Gyeonggi-do (KR); Sangho Lee, Gyeonggi-do (KR); Mooyoung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/565,578

(22) Filed: Sep. 10, 2019

(65) Prior Publication Data

US 2020/0092896 A1     Mar. 19, 2020

(30) Foreign Application Priority Data

Sep. 18, 2018     (KR) .................. 10-2018-0111402

(51) Int. Cl.
| | |
|---|---|
| *H04W 72/12* | (2009.01) |
| *H04W 76/30* | (2018.01) |
| *H04W 64/00* | (2009.01) |
| *H04W 76/10* | (2018.01) |
| *H04W 88/06* | (2009.01) |

(52) U.S. Cl.
CPC ....... *H04W 72/1215* (2013.01); *H04W 64/00* (2013.01); *H04W 72/1268* (2013.01);
(Continued)

(58) Field of Classification Search
CPC . H04W 72/1215; H04W 76/30; H04W 64/00; H04W 72/1268; H04W 76/10;
(Continued)

(56) References Cited

U.S. PATENT DOCUMENTS 6,643,262 B1 * 11/2003 Larsson .............. H04L 12/2856
                                                      370/236
9,003,391 B2     4/2015 Oh et al.
(Continued)

FOREIGN PATENT DOCUMENTS

| EP | 3592008 A1 | 1/2020 |
|---|---|---|
| KR | 10-2013-0003355 A | 1/2013 |

(Continued)

OTHER PUBLICATIONS

Nokia et al., Always-on PDU session indication in the route selection descriptor; C185285, 3GPP TSG-CT WG1 Meeting #112; West Palm Beach, FL (USA); Aug. 13, 2018.
(Continued)

*Primary Examiner* — Lakeram Jangbahadur
(74) *Attorney, Agent, or Firm* — Cha & Reiter, LLC

(57) ABSTRACT

An electronic device is provided. The electronic device includes a first processor configured to perform wireless communication with a local area data network (LADN), and a second processor electrically connected with the first processor. The first processor is configured to receive a first message from the LADN indicating that a wireless communication session with the LADN is deactivated because the electronic device has departed from a geographic service area of the LADN, after receiving the first message, and transmit a second message to the second processor indicating that the wireless communication session is deactivated. The second processor is configured to terminate generation of a data packet for uplink transmission after receiving the second message.

16 Claims, 9 Drawing Sheets

(52) U.S. Cl.
CPC ........... *H04W 76/10* (2018.02); *H04W 76/30* (2018.02); *H04W 88/06* (2013.01)

(58) Field of Classification Search
CPC ..... H04W 88/06; H04W 76/12; H04W 76/19; H04W 76/32
See application file for complete search history.

(56) References Cited

U.S. PATENT DOCUMENTS

| | | |
|---|---|---|
| 9,913,218 B2 | 3/2018 | Richards |
| 9,924,413 B2 | 3/2018 | Adjakple et al. |
| 10,149,343 B2 | 12/2018 | Pasupuleti et al. |
| 2013/0003697 A1* | 1/2013 | Adjakple ............... H04W 40/34 370/331 |
| 2016/0338036 A1* | 11/2016 | Pasupuleti ............ H04W 72/08 |
| 2018/0160371 A1 | 6/2018 | Richards |
| 2019/0182788 A1* | 6/2019 | Lee ....................... H04W 60/00 |

FOREIGN PATENT DOCUMENTS

| | | | |
|---|---|---|---|
| KR | 10-2018-0021636 A | 3/2018 | |
| WO | 2019-216683 A1 | 11/2019 | |

OTHER PUBLICATIONS

International Search Report dated Jan. 23, 2020.
European Search Report dated Aug. 6, 2021.

\* cited by examiner

ELECTRONIC DEVICE FOR PREVENTING PACKET DROP FOR UPLINK TRANSMISSION

CROSS-REFERENCE TO RELATED APPLICATION(S)

This application is based on and claims priority under 35 U.S.C. § 119 to Korean Patent Application No. 10-2018-0111402, filed on Sep. 18, 2018, in the Korean Intellectual Property Office, the disclosure of which is incorporated by reference herein, in its entirety.

BACKGROUND

1. Field

The disclosure relates to computer networking, and, more particularly, to preventing a packet drop during uplink transmissions.

2. Description of Related Art

Recently, technologies associated with a local area data network (LADN) have been implemented in order to provide region-based services to users. The LADN may be a data network which is available in only a specific area (e.g., a school or an office). A user equipment (UE) disposed within the specific area may communicate with another UE using the LADN. In this regard, recently, there have been discussions conducted centering on possibly including the LADN the $5^{th}$ generation (5G) new radio (NR) specification, in $3^{rd}$ generation partnership project (3GPP).

The above information is presented as background information only to assist with an understanding of the present disclosure. No determination has been made, and no assertion is made, as to whether any of the above might be applicable as prior art with regard to the present disclosure.

SUMMARY

Because an LADN is available in only a specific area, when a UE departs from the specific area, the UE may become unable to communicate with another UE using the LADN. Thus, when the UE departs from the LADN, the LADN may release an LADN session or may deactivate the LADN session for the departed UE.

When the LADN session is released, the LADN and the UE may remove all information such as an internet protocol (IP) address associated with the LADN session, and a quality of service (QoS). Furthermore, the LADN may release a radio resource and may also release tunneling between a base station and a core network. When the UE enters the specific area again, the LADN should reinitiate a LADN session for the UE. When the UE departs from the specific area and reenters, because the LADN repeats generation of the LADN session, it is insufficient to release the LADN session. Instead, because the LADN session is released when the UE departs from the specific area, a UE application may determine that it is impossible to communicate with the LADN.

When the LADN session is deactivated, the LADN may release a radio resource and may release tunneling between the base station and the core network, but retaining other information, such as an IP address associated with the LADN session and a QoS. Thus, when the UE enters the specified geographic area again, the LADN and the UE may reactivate the LADN session to enable wireless communication. Herein, when the LADN session is deactivated, the UE application may fail to determine a possibility of continued communication with the LADN and thus continues to generate uplink traffic attempting to identify it. Accordingly, an unnecessary packet drop (or drops) may occur.

Aspects of the disclosure are to address at least the above-mentioned problems and/or disadvantages and to provide at least the advantages described further below. Accordingly, an aspect of the disclosure is to provide an electronic device for addressing the above-mentioned problems and issues raised in the disclosure.

In accordance with an aspect of the disclosure, an electronic device is provided. An electronic device may include a first processor configured to perform wireless communication with a local area data network (LADN), a second processor electrically connected with the first processor, wherein the first processor is configured to: receive a first message from the LADN indicating that a wireless communication session with the LADN is deactivated because the electronic device has departed from a geographic service area of the LADN, after receiving the first message, transmit a second message to the second processor indicating that the wireless communication session is deactivated, wherein the second processor is configured to: after receiving the second message, terminate generation of a data packet for uplink transmission.

In accordance with another aspect of the disclosure, an electronic device is provided. An electronic device may include a first processor configured to perform wireless communication with a local area data network (LADN), a second processor electrically connected with the first processor and configured to generate a data packet for uplink transmission, wherein the first processor is configured to: receive a first message from the LADN indicating that a wireless communication session with the LADN is deactivated because the electronic device has departed from a geographic service area of the LADN, and after detecting that the wireless communication session is deactivated, initiate buffering of data packets for the uplink transmission in absence of transmitting the data packet to the LADN.

In accordance with another aspect of the disclosure, an electronic device is provided. An electronic device may include at least one processor configured to perform wireless communication with a local area data network (LADN), and a memory, electrically connected with the at least one processor, storing instructions executable by the at least one processor to cause the electronic device to: generate data packets for uplink transmission with the LADN, detect that the electronic device has left a geographic service area of the LADN, and after detecting that the electronic device has left the geographic service area, terminating the generation of data packets for the uplink transmission.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
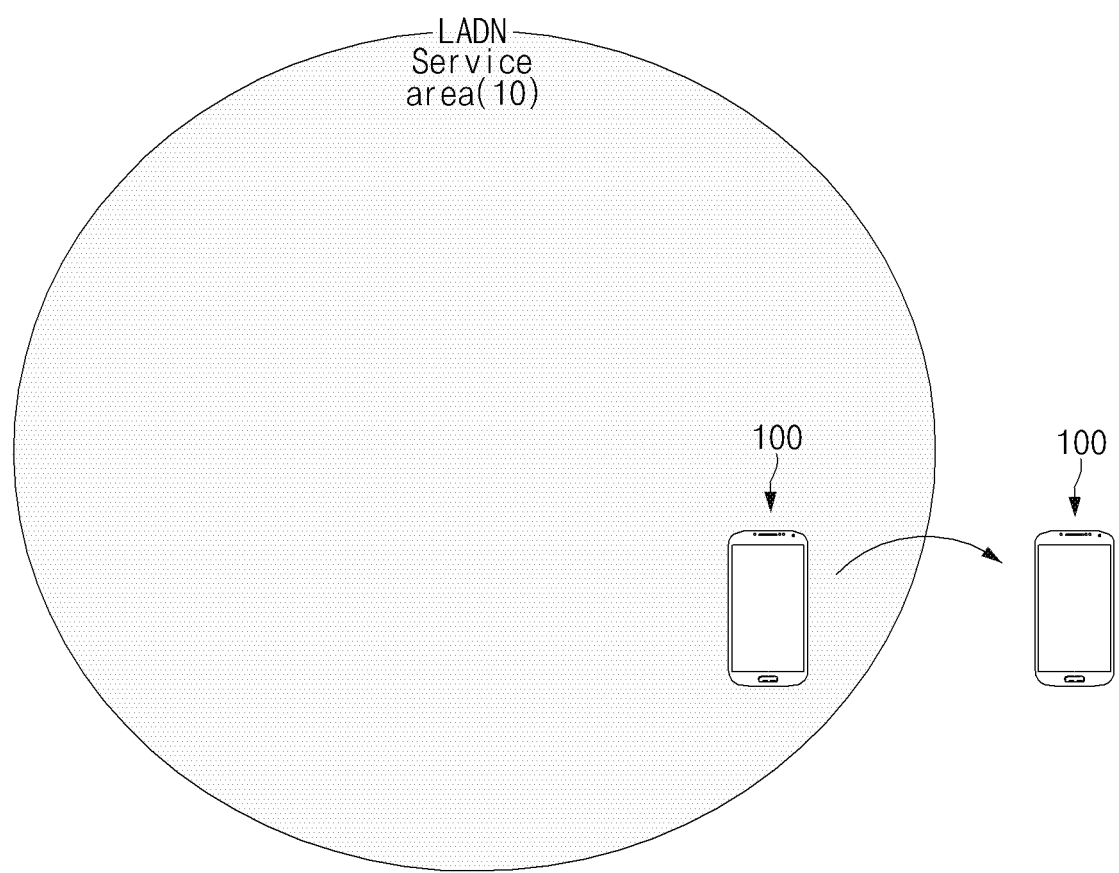
FIG. 1 is a drawing illustrating a service area of a local area data network (LADN) and an electronic device according to an example embodiment.

FIG. 1 is a drawing illustrating a service area of a local area data network (LADN) and an electronic device according to an example embodiment.

Referring to FIG. 1, when an electronic device 100 is located in a service area 10 of the LADN, a user of a region-based service may be utilized by the electronic device 100. For example, when the service area 10 is "A" university, and the electronic device 100 is located at "A" university, a service (e.g., a network service) provided by "A" university may be accessed using the electronic device 100. In the disclosure, the electronic device 100 may be referred to as a user equipment (UE).

According to a comparison example, when an electronic device 100 departs from the geographic service area 10, the LADN may deactivate a corresponding LADN session. When the LADN session is deactivated, the LADN may release a radio resource and may release tunneling between a base station and a core network. Thus, when the electronic device enters the geographic service area 10 again, the LADN may activate the LADN session to reinitiate wireless communication with the electronic device. Thus, when departing from the service area 10, the electronic device may generate a data packet for uplink transmission, to identify whether it is possible to perform wireless communication with the LADN. Thus, an unnecessary packet drop may occur.

However, in some cases, when departing from the service area 10, the electronic device 100 may fail to generate a data packet for uplink transmission. For example, although the LADN deactivates the LADN session for the electronic device 100, the electronic device 100 may recognize that the LADN is released. Thus, the electronic device 100 may fail to generate a data packet for uplink transmission to prevent an unnecessary packet drop.

Figure 2:
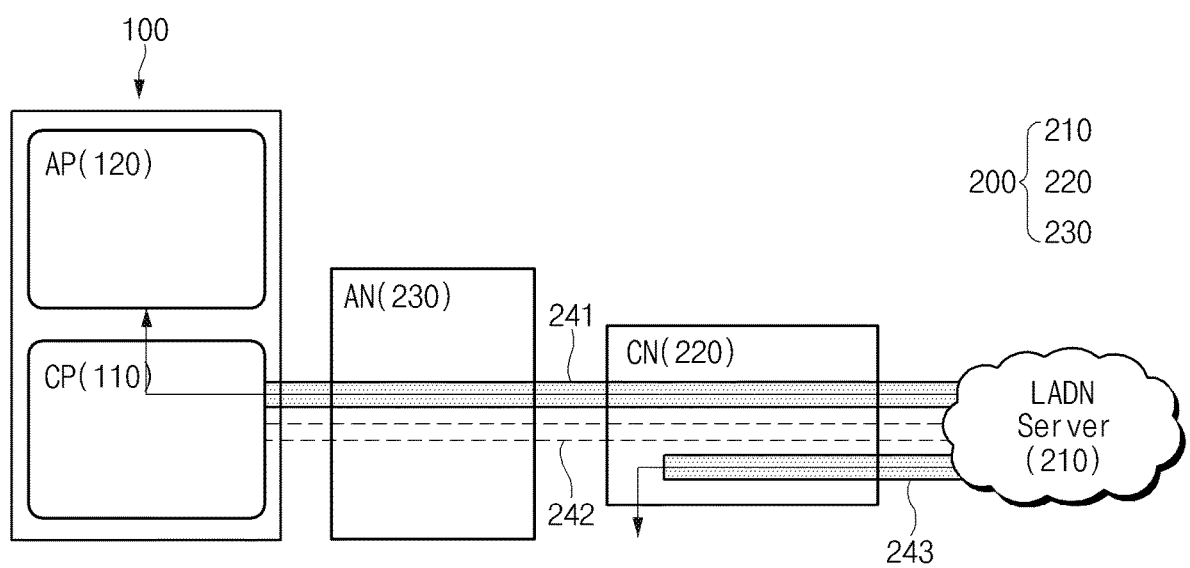
FIG. 2 is a block diagram illustrating an electronic device and an LADN according to an example embodiment.

FIG. 2 is a block diagram illustrating an electronic device and an LADN according to an embodiment. FIG. 2 is a block diagram illustrating an electronic device 100 described in FIG. 1 and an LADN 200 according to an embodiment.

Referring to FIG. 2, an LADN 200 may include an LADN server 210, a core network (CN) 220, and an access network (AN) 230.

The LADN server 210 may transmit and receive data (e.g., data packet or packets) with an electronic device 100 over the CN 220 and the AN 230 to provide a region-based service.

The CN 220 may manage one or more of subscriber information of the electronic device 100, mobility information of the electronic device 100 (e.g., information indicating a geographic and/or network location of the device), access authorization of the electronic device 100, network traffic including a data packet, and/or a billing policy for usage of the network. The CN 220 may include at least one of a user plane function (UPF) node, an access & mobility management function (AMF) node, a session management function (SMF) node, a unified data management (UDM) node, or a policy control function (PCF) node.

The AN 230 may provide a channel for wireless communication with the electronic device 100. The AN 230 may include one or more of a radio access network (RAN), a base station, an eNodeB (eNB), a $5^{th}$ generation (5G) node, a transmission/reception point (TRP), and/or a 5G NodeB (5GNB).

The electronic device 100 may include a first processor 110 (e.g., CP) and a second processor 120 (e.g., AP).

The first processor 110 may perform wireless communication with the LADN 200. For example, the first processor 110 may establish a wireless communication channel between the electronic device 100 and the LADN 200, and may support performance of communication over the established communication channel. As noted above, in the disclosure, the first processor 110 may be alternatively referred to as a "communication processor" (CP).

The second processor 120 may be electrically connected with the first processor 110. The second processor 120 may execute software (e.g., a program) to control at least one other component (e.g., a hardware or software component) of the electronic device 100, as connected to the second processor 120, and may perform a variety of data processing operations or various arithmetic operations. As noted above, in the disclosure, the second processor 120 may be referred to as an "application processor" (AP).

According to an embodiment, a first session 241 shown in FIG. 2 indicates a state in which an LADN session is activated. When the LADN session is activated, the CN 220 may request the AN 230 to allocate a radio resource. Tunneling between the CN 220 and the AN 230 may be maintained. In this case, the electronic device 100 may perform wireless communication with the LADN 200 over a channel provided from the AN 230.

A second session 242 may indicate a state where the LADN session is released. When the LADN session is released, the CN 220 may request the AN 230 to release the allocated radio resource. The tunneling between the CN 220 and the AN 230 may be released. Furthermore, all information such as an internet protocol (IP) address associated with the LADN session and a quality of service (QoS) may be removed. In this case, because the LADN 200 and the electronic device 100 generate the LADN session upon initialization to perform wireless communication, the electronic device 100 may fail to generate a data packet for uplink transmission.

A third session 243 indicates a state where the LADN session is deactivated. When the LADN session is deactivated, the CN 220 may request the AN 230 to release the allocated radio resource. The tunneling between the CN 220 and the AN 230 may be released. However, information such as an IP address associated with the LADN session and a QoS may be retained. When the electronic device 100 enters the geographic service area 10 of FIG. 1, the third session 243 may be activated by allocating a radio source. In other words, when the electronic device 100 enters the service area 10, the third session 243 may be activated as operating like a continuation of the first session 241, by allocating a radio resource.

According to an embodiment, when the electronic device 100 departs from the service area 10 of the LADN 200, the CN 220 may detect the departure of the electronic device 100 from the service area 10 of the LADN 200. Furthermore, when the electronic device 100 departs from the service area 10 of the LADN 200, the CN 220 may deactivate the LADN session.

The first processor 110 may receive a first message indicating that the LADN session is deactivated from the LADN 200. Although the first processor 110 receives the first message indicating that the LADN session is deactivated, it may generate a second message indicating that the LADN session is released, and may transmit the generated second message to the second processor 120. The second processor 120 may receive the second message and recognize that the LADN session is released. Recognizing that the LADN session is released, the second processor 120 may fail to generate a data packet for uplink transmission.

According to a comparative example, when an electronic device departs from the service area 10, a first processor may receive a message indicating that an LADN session is deactivated from the LADN 200. When the LADN session is deactivated, the first processor may fail to notify a second processor that the LADN session is deactivated. Thus, the second processor may generate a data packet for uplink transmission on the assumption that the LADN session is still activated. Thus, an unnecessary packet drop may occur. However, although the LADN 200 deactivates the LADN session, the electronic device 100 according to an embodiment of the disclosure may recognize that the LADN session is released. Thus, the second processor 120 may fail to generate a data packet for uplink transmission to prevent an unnecessary packet drop.

Details described with reference to FIGS. 1 and 2 are applicable to components which have the same reference numerals as the electronic device 100 and the LADN 200 shown in FIG. 1 and FIG. 2.

Figure 3A:
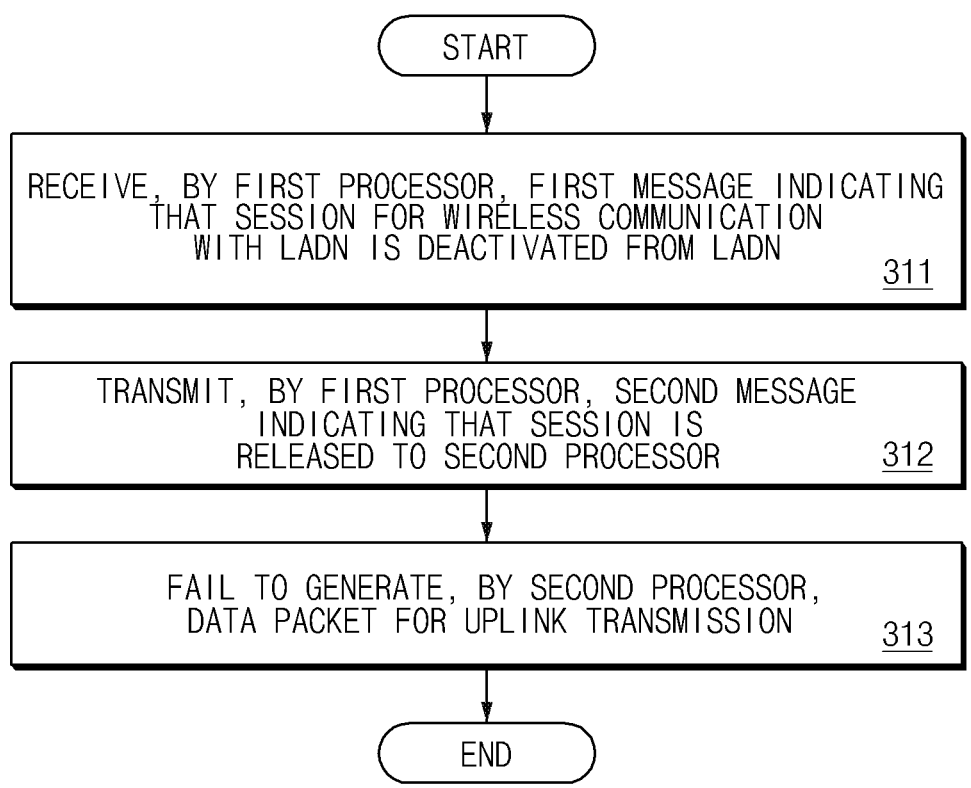
FIG. 3A is a flowchart illustrating an operation of an electronic device according to an example embodiment.

FIG. 3A is a flowchart illustrating an operation of an electronic device according to an example embodiment.

Referring to FIG. 3A, in operation 311, when an electronic device (e.g., 100 of FIG. 2) departs from a service area (e.g., 10 of FIG. 1), a first processor (e.g., 110 of FIG. 2) may receive a first message from an LADN (e.g., 200 of FIG. 2). The first message may refer to a message indicating that a session for wireless communication with the LADN 200 is deactivated. In the disclosure, the session for the wireless communication with the LADN 200 may be referred to as an LADN session.

In operation 312, the first processor 110 may generate a second message and transmit the generated second message to a second processor 120 of FIG. 2. The second message indicate that the wireless communication session with the LADN 200 has been released, to prevent a data packet for uplink transmission from being generated.

In operation 313, the second processor 120 may fail to generate a data packet for uplink transmission. According to a comparative example, when an electronic device departs from the service area 10, a first processor may receive a message indicating that a session for wireless communication with the LADN 200 is deactivated from the LADN 200. When the LADN session is deactivated, the first processor may fail to notify a second processor that the session for the wireless communication with the LADN 200 is deactivated. Thus, the second processor may generate a data packet for uplink transmission on the assumption that the LADN session is still active. Thus, an unnecessary packet drop may occur. However, although a session for wireless communication with the LADN 200 is deactivated, the second processor 120 may recognize that the session for the wireless communication with the LADN 200 is released. Thus, the second processor 120 may not generate a data packet for uplink transmission to prevent an unnecessary packet drop.

Figure 3B:
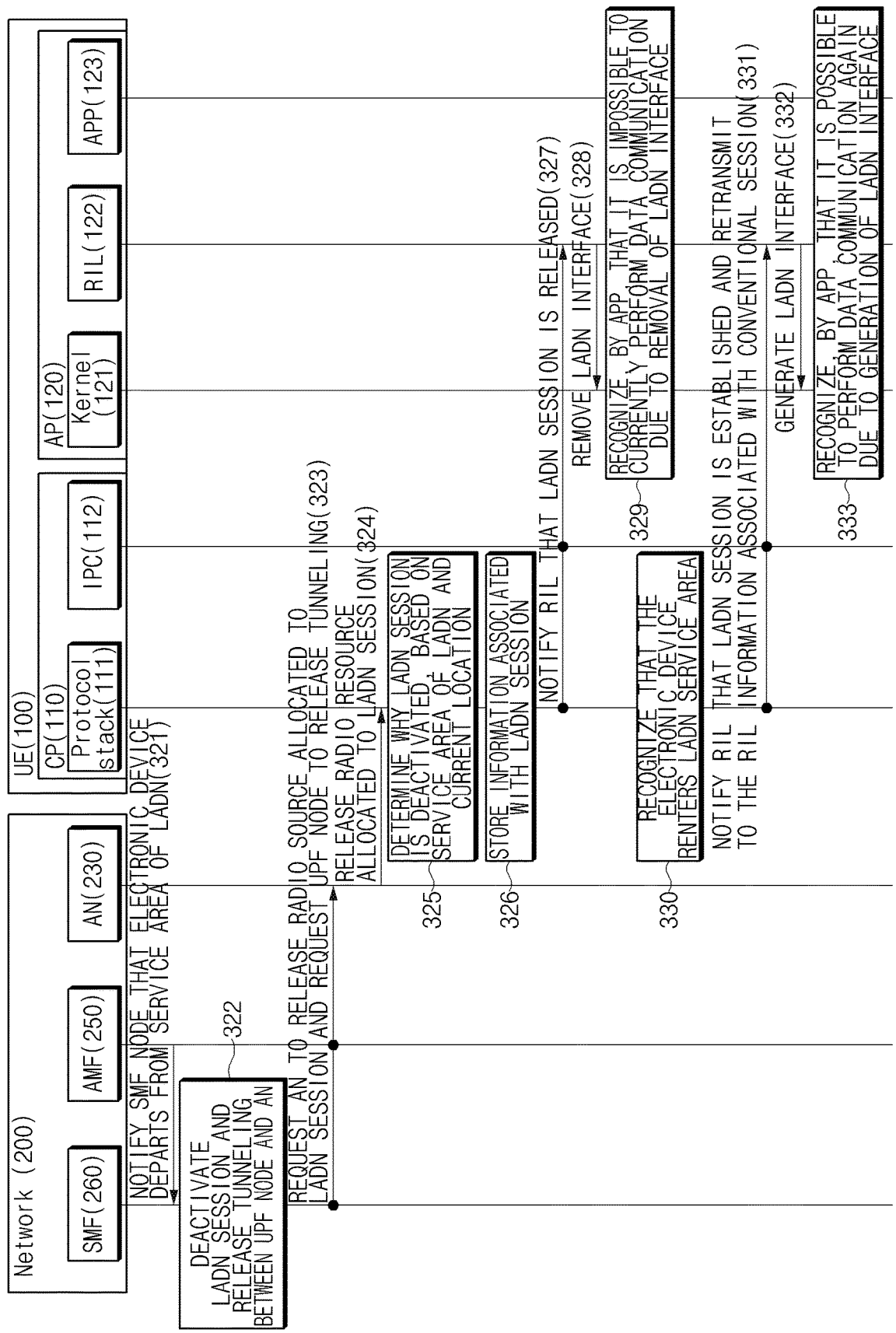
FIG. 3B is a signal sequence diagram illustrating operations of an LADN and an electronic device according to an example embodiment.

FIG. 3B is a signal sequence diagram illustrating operations of an LADN and an electronic device according to an example embodiment. FIG. 3B is a drawing illustrating detailed operations of an LADN 200 and an electronic device 100 according to an example embodiment.

Referring to FIG. 3B, a LADN 200 may include an access network (AN) 230, an access & mobility management function (AMF) node 250, and a session management function (SMF) node 260.

An electronic device (e.g., a UE) 100 may include a first processor (e.g., a CP) 110 and a second processor (e.g., an AP) 120. The first processor 110 may include a protocol stack 111 and an inter processor communication module (IPC) 112. The second processor 120 may include a kernel 121, a radio interface layer (RIL) 122, and an app 123. App 123 may be an application program that may be executed by the second processor 120.

In operation 321, the AMF node 250 may detect whether the electronic device 100 is located in a geographic service area 10 of an LADN 200. When the electronic device 100 departs from the service area 10, the AMF node 250 may notify the SMF node 260 that the electronic device 100 has departed from the service area 10.

When the electronic device 100 departs from the service area 10, in operation 322, the SMF node 260 may deactivate a LADN session. Furthermore, in operation 322, the SMF node 260 may release tunneling between a user plane function (UPF) node and the AN 230.

In operation 323, the SMF node 260 may request the AN 230 to release a radio resource allocated to the LADN session. Furthermore, in operation 323, the SMF node 260 may request the UPF node to release the tunneling between the UPF node and the AN 230.

In operation 324, the AN 230 may release the radio resource allocated to the LADN session, based on the request received from the SMF node 260. The AN 230 may notify the electronic device 100 that the radio resource allocated to the LADN session is released, by means of a radio resource control (RRC) message. In the disclosure, the RRC message may be referred to as a first message.

In operation 325, the protocol stack 111 may determine that the radio resource allocated to the LADN session is released, based on the RRC message received from the AN 230. When the radio resource allocated to the LADN session is released, the protocol stack 111 may determine that the LADN session is deactivated. Furthermore, the protocol stack 111 may determine a prespecified rationale indicating a cause of the LADN session being deactivated, based on at least the service area 10 and a current location of the electronic device 100.

According to an embodiment, when the electronic device 100 is detected as being located in the service area 10 by the first processor 110, the second processor 120 may generate a data packet for uplink transmission. The data packet may be delivered to the first processor 110 through an interface maintained in the second processor 120. The first processor 110 may recognize that the LADN session is deactivated, and may transmit a service request to the LADN 200. When the service request is transmitted, the LADN session may be reactivated. The electronic device 100 may transmit the data packet to the LADN 200.

Conversely, when the electronic device 100 is detected as being located outside the service area 10 by the first processor 110, operation 326 may be performed.

In operation 326, the protocol stack 111 may store information associated with the LADN session. The information associated with the LADN session may include, for example, an IP address of the electronic device 100 allocated by the first processor 110 when the LADN session is generated, a domain name server (DNS) address, quality of service (QoS) information, or the like.

In operation 327, the protocol stack 111 may transmit a second message indicating that the LADN session is released (e.g., removed) to the RIL 122.

In operation 328, the RIL 122 may remove an LADN interface based on the second message received from the protocol stack 111.

In operation 329, the second processor 120 may recognize that it is impossible to perform wireless communication with the LADN 200, and may fail to generate (e.g., abstain from generating) a data packet for uplink transmission. According to a comparison example, when an electronic device departs from the service area 10, a first processor may receive a message indicating that an LADN session is deactivated from the LADN 200. According to a comparative example, when the LADN session is deactivated, the first processor may fail to notify (e.g., abstain from notifying) the second processor that the LADN session is deactivated. Thus, the second processor may generate a data packet for uplink transmission operating under the premise that the LADN session is active. However, in the present disclosure, although the LADN session is deactivated, the electronic device 100 of the disclosure may recognize that the LADN session has been released. Thus, the second processor 120 may fail to generate (e.g., abstain from generating) a data packet for uplink transmission to prevent an unnecessary packet drop.

In operation 330, the protocol stack 111 may determine whether the electronic device 100 reenters the service area 10, based on a message (e.g., a tracking area code "TAC" information) transmitted from the AN 230. When the electronic device 100 enters the service area 10 as a result of the determination, operation 331 may be performed.

In operation 331, the protocol stack 111 may transmit a message indicating that the LADN session is generated (e.g., reestablished) to the RIL 122. Furthermore, the protocol stack 111 may transmit the information stored in operation 326 together with the message indicating that the LADN session is generated to the RIL 122.

In operation 332, the RIL 122 may generate an LADN interface based on the message and the information received from the protocol stack 111.

In operation 333, the second processor 120 may recognize that it is possible to perform wireless communication with the LADN 200. Thus, the second processor 120 may generate a data packet for uplink transmission. The data packet may be delivered to the first processor 110 through the interface generated in operation 332. The first processor 110 may transmit a service request to the LADN 200. When the LADN is activated, the first processor 110 may transmit a data packet for uplink transmission.

Figure 4A:
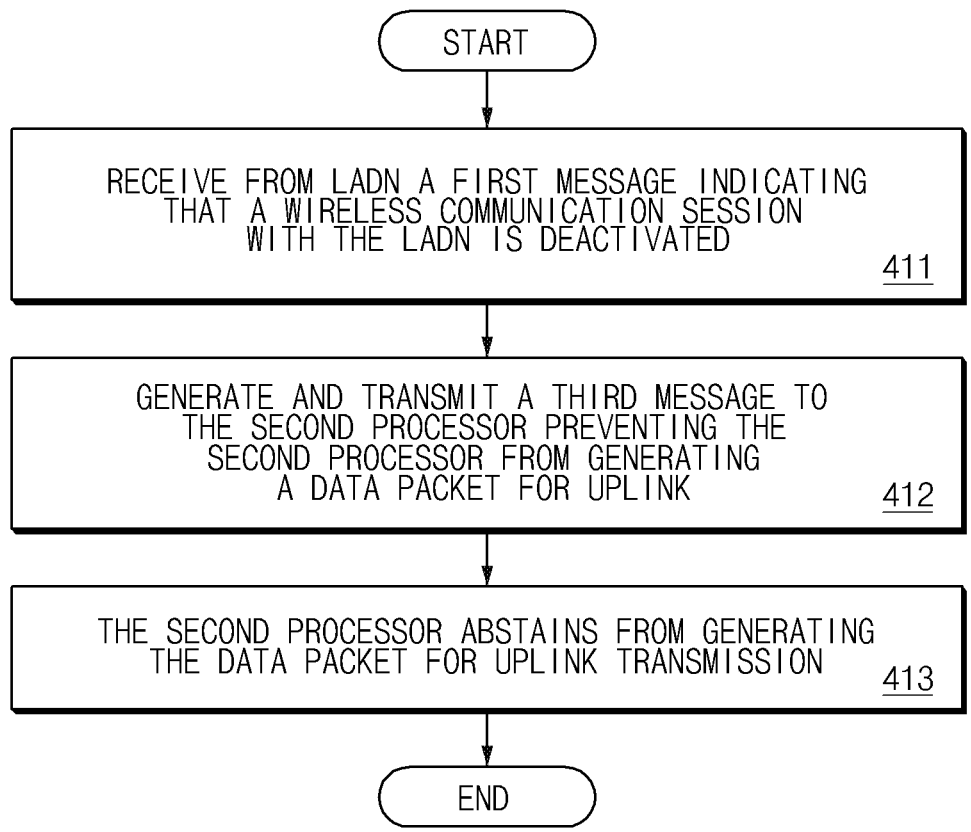
FIG. 4A is a flowchart illustrating an operation of an electronic device according to an example embodiment.

FIG. 4A is a flowchart illustrating an operation of an electronic device according to an example embodiment.

Referring to FIG. 4A, in operation 411, when an electronic device (e.g., 100 of FIG. 2) departs from a service area (e.g., 10 of FIG. 1), a first processor (e.g., 110 of FIG. 2) may receive a first message from an LADN (e.g., 200 of FIG. 2). The first message may indicate that a session for wireless communication with the LADN 200 is deactivated. As with previous descriptions, the session for the wireless communication with the LADN 200 may be referred to as an LADN session.

In operation 412, the first processor 110 may generate a third message and transmit the generated third message to a second processor 120 of FIG. 2. The third message may prevent the second processor 120 from generating a data packet for uplink transmission, in a state where the wireless communication session with the LADN 200 is deactivated.

In operation 413, the second processor 120 may fail to generate (e.g., abstain from generating) the data packet for the uplink transmission. According to a comparative example, when an electronic device departs from the service area 10, a first processor may receive a message from the LADN 200 indicating that the wireless communication session with the LADN 200 is deactivated. According to a comparative example, if the first processor fails to notify the second processor that the wireless communication session with the LADN 200 is deactivated, the second processor may generate a data packet for uplink transmission erroneously operating under the presumption that the LADN session remains active. However, according to an embodiment of the disclosure, the first processor 110 may prevent the second processor 120 from generating a data packet for uplink transmission when the LADN session is deactivated, thus preventing an unnecessary packet drop.

Figure 4B:
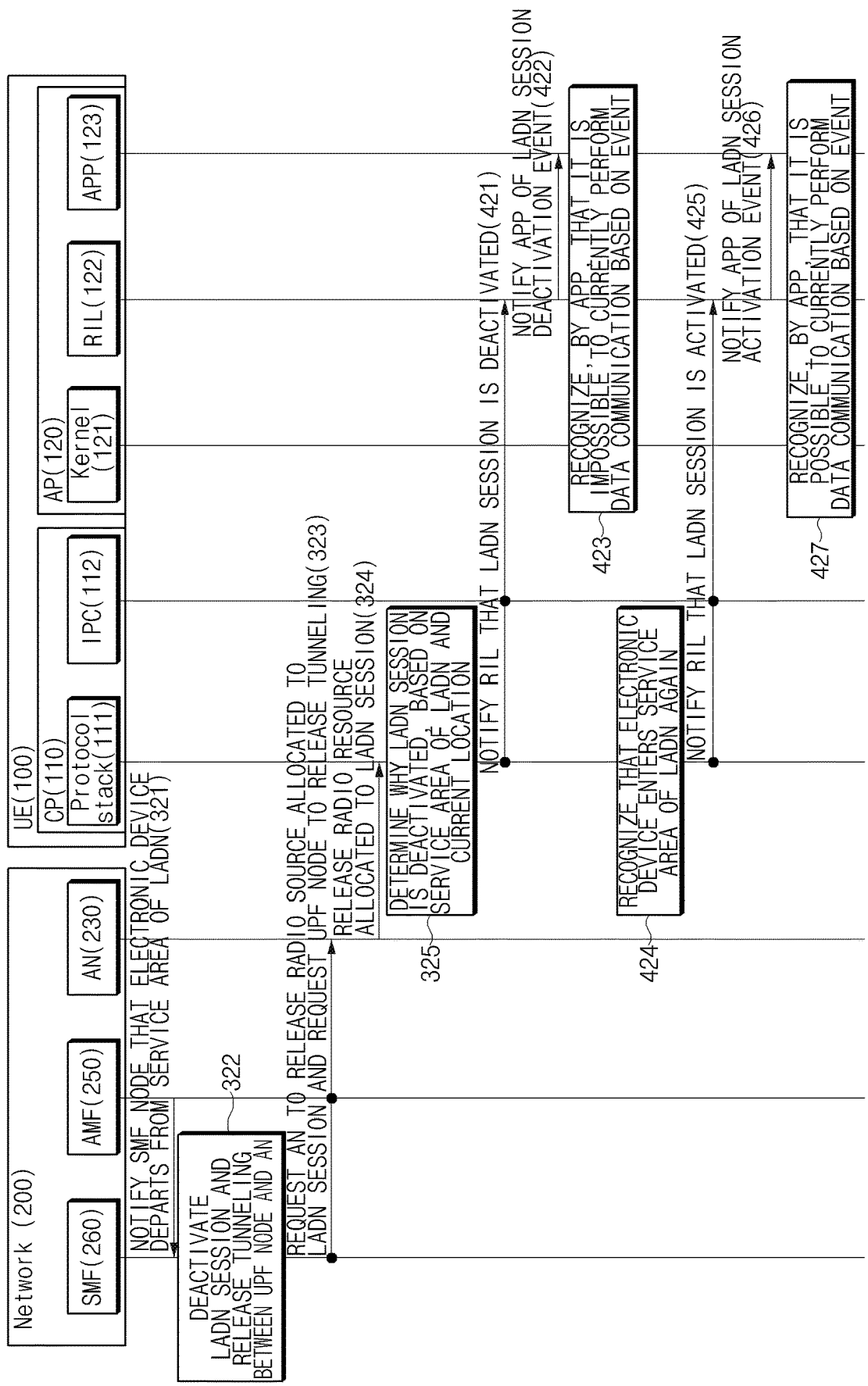
FIG. 4B is a signal sequence diagram illustrating operations of an LADN and an electronic device according to an example embodiment.

FIG. 4B is a signal sequence diagram illustrating operations of an LADN and an electronic device according to an example embodiment. FIG. 4B is a drawing illustrating detailed operations of an LADN 200 and an electronic device 100 according to an example embodiment.

Details described with reference to FIG. 3B are applicable to operations 321 to 325 shown in FIG. 4B. For the sake of brevity, applicant respectfully omits the descriptions of these steps as duplicative with the steps of FIG. 3B.

Referring to FIG. 4B, in operation 421, a protocol stack 111 may notify an RIL 122 that the LADN session is deactivated.

In operation 422, the RIL 122 may notify an app 123 that the LADN session is deactivated. In operation 423, a second processor (e.g., an AP) 120 may recognize that it is impossible to perform wireless communication with an LADN 200. According to a comparison example, when electronic device departs from a service area 10, the first processor may fail to notify the second processor that an LADN session is deactivated. Thus, the second processor may generate a data packet for uplink transmission on the premise that the LADN session is still active. However, according to an embodiment of the disclosure, a first processor (e.g., a CP) 110 may generate a third message preventing the second processor 120 from generating a data packet for uplink transmission when the LADN session is deactivated, and transmit the generated third message to the second processor 120. Thus, the second processor 120 may be preventing from generating the data packet for the uplink transmission, preventing an unnecessary packet drop.

In operation 424, the protocol stack 111 may determine whether an electronic device (e.g., a UE) 100 reenters the service area 10, based on a message (e.g., TAC information)

transmitted from an AN 230. When the electronic device 100 is detected as reentering into the service area 10, operation 425 may be performed.

In operation 425, the protocol stack 111 may transmit a message indicating that the LADN session is activated (e.g., reestablished) to the RIL 122.

In operation 426, the RIL 122 may transmit the message indicating that the LADN session is activated to the app 123.

In operation 427, the second processor 120 may recognize that wireless communication with the LADN 200 is possible. Thus, the second processor 120 may generate a data packet for uplink transmission, and the first processor 110 may transmit a data packet for uplink transmission.

Figure 5A:
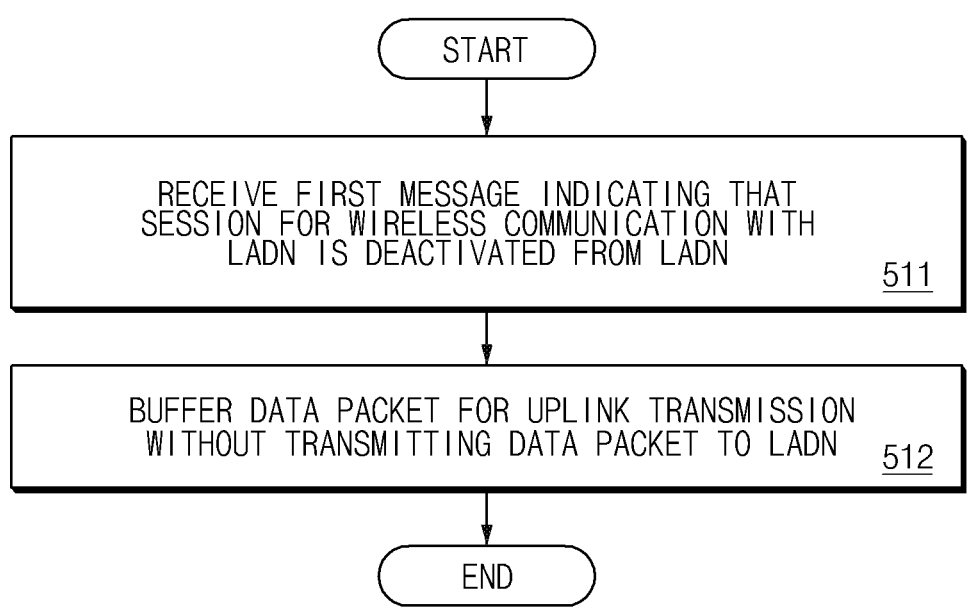
FIG. 5A is a flowchart illustrating an operation of an electronic device according to an example embodiment.

FIG. 5A is a flowchart illustrating an operation of an electronic device according to an example embodiment.

Referring to FIG. 5A, when an electronic device (e.g., 100 of FIG. 2) leaves a service area (e.g., 10 of FIG. 1), in operation 511, a first processor (e.g., 110 of FIG. 2) may receive a first message from an LADN (e.g., 200 of FIG. 2). The first message may indicate that a wireless communication session with the LADN 200 is deactivated. The wireless communication session with the LADN 200 may be referred to as an "LADN session."

In operation 512, the first processor 110 may buffer a data packet generated for uplink transmission, without transmitting the data packet to the LADN 200. For example, when the electronic device 100 leaves the service area 10, a second processor 120 of FIG. 2 may generate the data packet, to identify whether it is possible to perform wireless communication with the LADN 200. The generated data packet may be delivered to the first processor 110 through an interface which is maintained in the second processor 120. The first processor 110 may buffer the delivered data packet, without transmitting the data packet to the LADN 200.

According to a comparative example, when an electronic device leaves the service area 10, a data packet for uplink transmission may be dropped from the first processor 110. A second processor may recognize that it is impossible to perform wireless communication based on a lack of response from the LADN 200, and may continue attempts to identify whether wireless communication with the LADN 200 is possible. However, according to an embodiment of the disclosure, by buffering a data packet for uplink transmission without dropping the data packet, the first processor 110 may prevent an unnecessary packet drop.

Figure 5B:
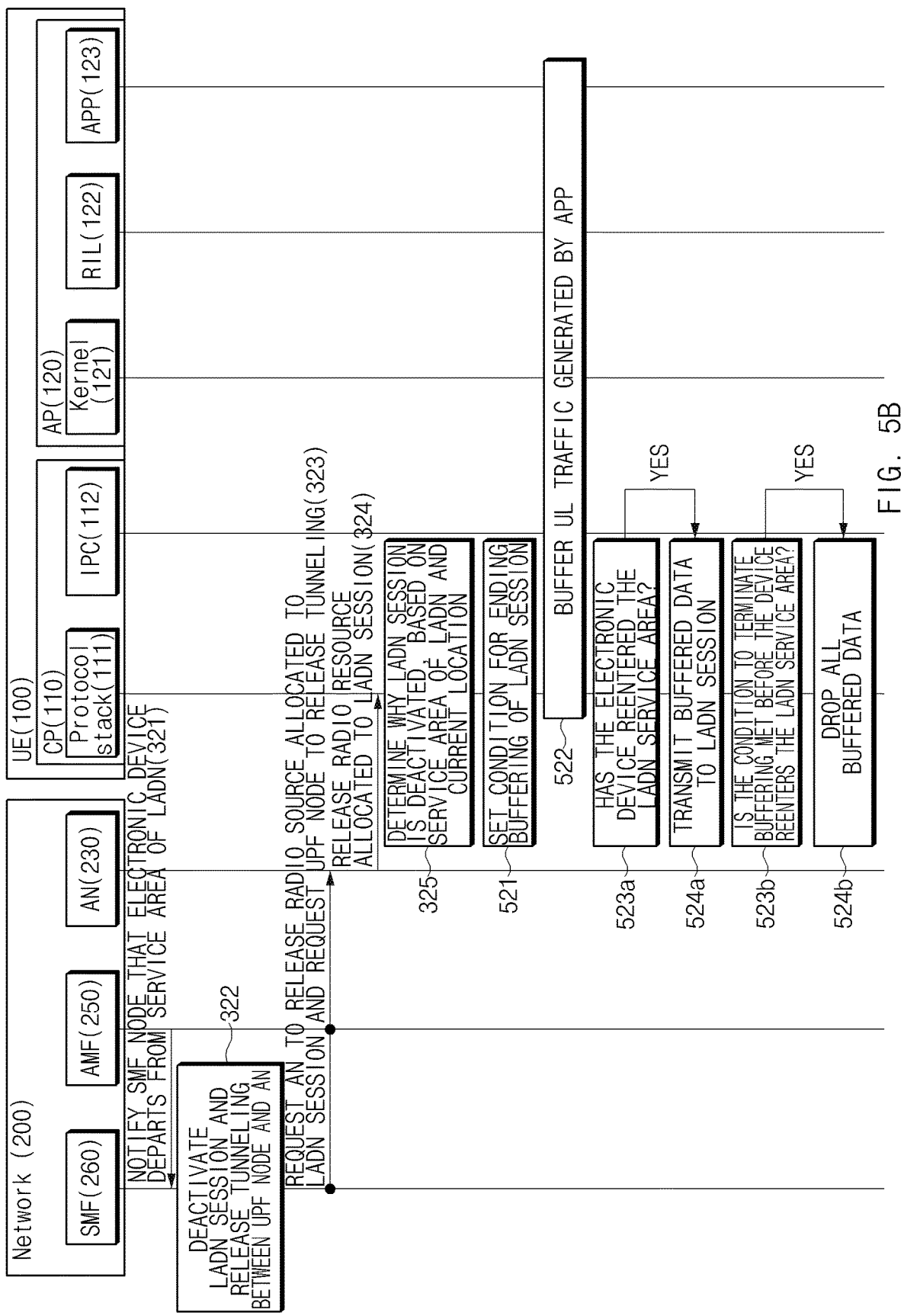
FIG. 5B is a signal sequence diagram illustrating operations of an LADN and an electronic device according to an example embodiment.

FIG. 5B is a signal sequence diagram illustrating operations of an LADN and an electronic device according to an example embodiment. FIG. 5B is a drawing illustrating detailed operations of an LADN 200 and an electronic device 100 according to an example embodiment.

Details described with reference to FIG. 3B are applicable to operations 321 to 325 shown in FIG. 5B. Accordingly, the descriptions of operations 321 to 325 for FIG. 5B will be omitted for the sake of brevity.

Referring to FIG. 5B, in operation 521, a protocol stack 111 may set a condition in which a first processor (e.g., a CP) 110 terminates buffering of a data packet for uplink transmission. For example, when an electronic device (e.g., a UE) 100 does not enter a service area of a LADN 200 within a specified time, when the electronic device 100 is located beyond a prespecified distance from the LADN 200, and/or when an count of buffered data packets exceeds a prespecified value, the first processor 100 may be configured to terminate the buffering.

In operation 522, the first processor 110 may buffer a data packet for uplink transmission, as generated by a second processor (e.g., an AP) 120. For example, when the electronic device 100 leaves a service area 10, the second processor 120 may generate a data packet for uplink transmission. The first processor 110 may buffer the data packet, without transmitting the data packet to the LADN 200.

According to a comparative example, when an electronic device leaves the service area 10, a data packet for uplink transmission may be dropped from a first processor stage. A second processor may recognize that it is impossible to perform wireless communication based on a lack of response from the LADN 200, and may continue attempts to identify wireless communication with the LADN 200 is possible. However, according to an embodiment of the disclosure, because the first processor 110 buffers a data packet for uplink transmission without dropping the data packet, the disclosure may prevent an unnecessary packet drop.

In operation 523a, when the electronic device 100 reenters the service area 10, the protocol stack 111 may determine whether the electronic device 100 has reentered the service area 10, based on a message (e.g., TAC information) transmitted from an AN 230. When the electronic device 100 is determined to have reentered the service area 10, operation 524a may be performed.

In operation 524a, the electronic device 100 may transmit the buffered data packet to the LADN 200.

As another example, in operation 523b, the condition for ending the buffering may be met. For example, the electronic device 100 may fail to reenter the LADN 200 within a specified time, the electronic device 100 may be located outside a prespecified distance from the LADN 200, and/or an amount of buffered data packets may exceed the prespecified value. In this case, although the electronic device 100 reenters the service area 10, operation 524b may be performed.

In operation 524b, the first processor 110 may drop all of the buffered data packets.

An electronic device according to an embodiment of the disclosure may include a first processor that performs wireless communication with a local area data network (LADN) and a second processor electrically connected with the first processor. The first processor may receive a first message indicating that a session for wireless communication with the LADN is deactivated from the LADN and may transmit a second message indicating that the session is released to the second processor when the first message is received, based on determination that cause of receiving the first message is that the electronic device departs from a service area of the LAND. The second processor may fail to generate a data packet for uplink transmission in response to receiving the second message.

According to an embodiment of the disclosure, the first processor may transmit a third message causing the second processor not to generate a data packet for the uplink transmission in a state where the session is deactivated to the second processor, in response to receiving the first message.

According to an embodiment of the disclosure, when the session is deactivated, a radio resource for wireless communication with the LADN may be released and an address of the electronic device and a protocol type may be maintained.

According to an embodiment of the disclosure, when the session is released, a radio resource for wireless communication with the LADN, an address of the electronic device, and a protocol type may be removed.

According to an embodiment of the disclosure, the electronic device may further include a memory electrically connected with the first processor. The first processor may store at least any one of an address of the electronic device, a domain name server (DNS) address, and quality of service (QoS) information in the memory in response to receiving the first message.

According to an embodiment of the disclosure, when the electronic device enters the LADN, the first processor may transmit a third message indicating that the session is established to the second processor.

According to an embodiment of the disclosure, the second processor may generate a data packet for the uplink transmission in response to receiving the third message.

According to an embodiment of the disclosure, the first processor may determine whether the electronic device enters the LADN, based on TAC information received from a base station.

According to an embodiment of the disclosure, the first message may correspond to a radio resource control (RRC) message. The first processor may determine whether the session is deactivated, based on whether a radio resource corresponding to the session is released.

According to an embodiment of the disclosure, the second processor may remove an interface corresponding to the session in response to receiving the second message.

An electronic device according to an embodiment of the disclosure may include a first processor that performs wireless communication with a local area data network (LADN) and a second processor that is electrically connected with the first processor and generates a data packet for uplink transmission. The first processor may receive a first message indicating that a session for wireless communication with the LADN is deactivated from the LADN, when the electronic device departs from a service area of the LADN, and may buffer a data packet for the uplink transmission without transmitting the data packet to the LADN.

According to an embodiment of the disclosure, the first processor may set a condition for ending the buffering.

According to an embodiment of the disclosure, the first processor may drop the buffered data packet, when the condition is met.

According to an embodiment of the disclosure, the first processor may transmit the buffered data packet to the LADN, when the condition is not met and when the electronic device enters the service area.

According to an embodiment of the disclosure, the condition for ending the buffering may include at least any one of a first condition in which the electronic device does not enter the LADN within a specified time, a second condition in which the electronic device is located outside a specified distance from the LADN, and a third condition in which an amount of the buffered data packets is greater than a specified value.

An electronic device according to an embodiment of the disclosure may include at least one processor that performs wireless communication with a local area data network (LADN) and a memory that is electrically connected with the at least one processor and stores instructions. The instructions, when executed, may cause the at least one processor not to generate a data packet for uplink transmission when the electronic device departs from a service area of the LADN.

According to an embodiment of the disclosure, the at least one processor may include a first processor and a second processor. The first processor may receive a first message indicating that a session for wireless communication with the LADN is deactivated from the LADN, when the electronic device departs from the service area of the LADN, and may transmit a second message indicating that the session is released to the second processor, when the first message is received.

According to an embodiment of the disclosure, the second processor may fail to generate a data packet for the uplink transmission in response to receiving the second message.

According to an embodiment of the disclosure, the first processor may correspond to a communication processor, and the second processor may correspond to an application processor.

According to an embodiment of the disclosure, the at least one processor may store at least any one of an address of the electronic device, a domain name server (DNS) address, and quality of service (QoS) information in the memory, when the electronic device departs from the service area of the LADN.

Figure 6:
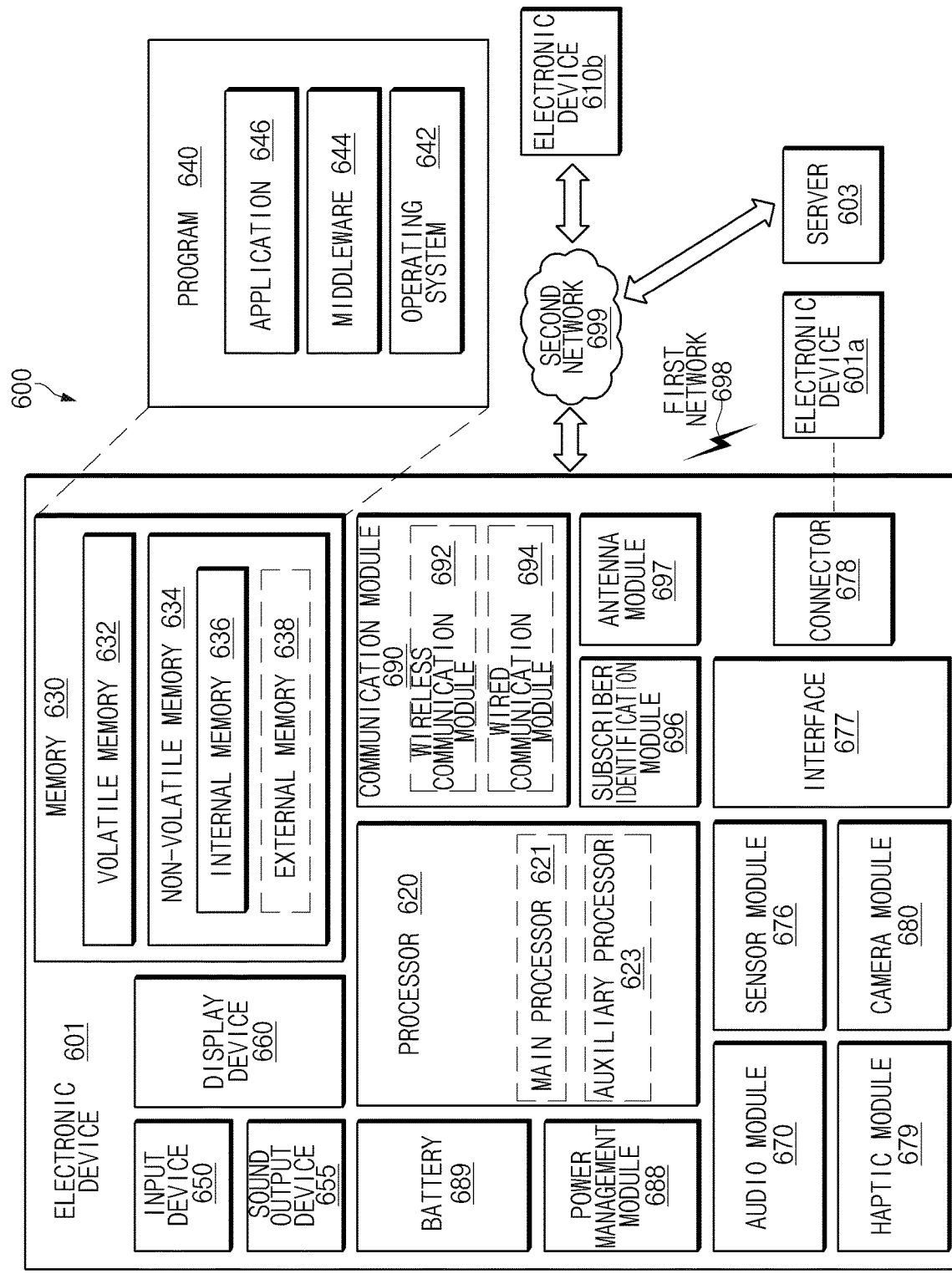
FIG. 6 is a block diagram illustrating an electronic device in a network environment according to certain embodiments.

FIG. 6 is a block diagram illustrating an electronic device 601 in a network environment 600 according to certain embodiments. Referring to FIG. 6, the electronic device 601 in the network environment 600 may communicate with an electronic device 601a via a first network 698 (e.g., a short-range wireless communication network), or an electronic device 610b or a server 603 via a second network 699 (e.g., a long-range wireless communication network). According to an embodiment, the electronic device 601 may communicate with the electronic device 610b via the server 603. According to an embodiment, the electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 6967. In some embodiments, at least one (e.g., the display device 660 or the camera module 680) of the components may be omitted from the electronic device 601, or one or more other components may be added in the electronic device 601. In some embodiments, some of the components may be implemented as single integrated circuitry. For example, the sensor module 676 (e.g., a fingerprint sensor, an iris sensor, or an illuminance sensor) may be implemented as embedded in the display device 660 (e.g., a display).

The processor 620 may execute, for example, software (e.g., a program 640) to control at least one other component (e.g., a hardware or software component) of the electronic device 601 coupled with the processor 620, and may perform various data processing or computation. According to an embodiment, as at least part of the data processing or computation, the processor 620 may load a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, a keyboard, or a digital pen (e.g., a stylus pen).

The sound output device 655 may output sound signals to the outside of the electronic device 601. The sound output device 655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to an embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to an embodiment, the audio module 670 may obtain the sound via the input device 650, or output the sound via the sound output device 655 or a headphone of an external electronic device (e.g., an electronic device 601a) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 601a) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 601a). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to an embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 601a, the electronic device 610b, or the server 603) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to an embodiment, the antenna module 697 may include an antenna including a radiating element implemented using a conductive material or a conductive pattern formed in or on a substrate (e.g., PCB). According to an embodiment, the antenna module 697 may include a plurality of antennas. In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 610b via the server 603 coupled with the second network 699. Each of the electronic devices 601a and 610b may be a device of a same type as, or a different type, from the electronic device 601. According to an embodiment, all or some of operations to be executed at the electronic device 601 may be executed at one or more of the external electronic devices 601a, 610b, or 603. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may prevent a packet drop for uplink transmission.

In addition, various effects directly or indirectly ascertained through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
   a first processor configured to perform wireless communication with a local area data network (LADN); and
   a second processor electrically connected with the first processor,
   a memory electrically connected with the first processor,
   wherein the first processor is configured to:
      receive a first message from the LADN indicating that a wireless communication session with the LADN is deactivated rather than released,
         wherein the first message includes a radio resource control (RRC) message,
         wherein release includes release of radio resources and tunneling with the LADN, and removal information associated with the LADN, and
         wherein deactivation includes release of radio resources and tunneling, and retaining of information associated with the LADN;
      after receiving the first message, store at least one of an address of the electronic device, a domain name server (DNS) address, and quality of service (QoS) information in the memory;
      determine whether the wireless communication session is deactivated because the electronic device has departed from a geographic service area of the LADN, wherein the first processor is configured to determine whether the wireless communication session is deactivated, according to whether a radio resource corresponding to the wireless communication session is released;
      when determining that deactivation is based on departure from the geographic service area, transmit a second message to the second processor indicating that the wireless communication session is released rather than deactivated, wherein the second processor terminates generation of a data packet for uplink transmission based on the indication that the wireless communication session is released, while the wireless communication session is deactivated rather than released; and
      when determining that deactivation is unrelated to the geographic service area and the electronic device remains in the geographic service area, permit the second processor to continue generating the data packet for uplink transmission, transmit a service request to the LADN, and reactivate the wireless communication session for transmission of the generated data packet.

2. The electronic device of claim 1, wherein the first processor is configured to:
   after the wireless communication session with the LADN is deactivated, transmit a third message to the second processor causing the second processor to restrict generation of a data packet for the uplink transmission while the wireless communication session is deactivated.

3. The electronic device of claim 1, wherein deactivation of the wireless communication session includes releasing the radio resources for wireless communication with the LADN, and storing the address of the electronic device and a protocol type for communication.

4. The electronic device of claim 1, wherein deactivation of the wireless communication session includes releasing the radio resources for wireless communication with the LADN, and removing the address of the electronic device and a protocol type for communication from the memory.

5. The electronic device of claim 1, wherein, after the electronic device enters the geographic service area of the LADN, the first processor is configured to: generate transmit a third message to the second processor indicating that the wireless communication session with the LADN is established.

6. The electronic device of claim 5, wherein the second processor is configured to: generate a data packet for the uplink transmission after receiving the third message.

7. The electronic device of claim 5, wherein the first processor is configured to: determine whether the electronic device enters the geographic service area of LADN using tracking area code (TAC) information received from a base station.

8. The electronic device of claim 1, wherein the second processor is configured to remove an interface corresponding to the wireless communication session after receiving the second message.

9. An electronic device, comprising:
   a first processor configured to perform wireless communication with a local area data network (LADN); and
   a second processor electrically connected with the first processor and configured to generate a data packet for uplink transmission,
   wherein the first processor is configured to:
      receive a first message from the LADN indicating that a wireless communication session with the LADN is deactivated rather than released, as the electronic device has departed from a geographic service area of the LADN,
      wherein the first processor is configured to determine whether the wireless communication session is deactivated, according to whether a radio resource corresponding to the wireless communication session is released, the release includes release of the radio resources and tunneling with the LADN, and removal of information associated with the LADN, and wherein deactivation includes release of the radio resources and tunneling, and retaining of information associated with the LADN;

transmit a second message to the second processor indicating that the wireless communication session is released rather than deactivated, whereas the LADN is deactivated rather than released; and after detecting that the wireless communication session is deactivated, initiate buffering of data packets for the uplink transmission in absence of transmitting the data packet to the LADN, wherein the first processor is configured to set a condition for terminating the buffering of data packets for the uplink transmission, and while the set condition is not met and the electronic device remains within the geographic service area of the LADN, transmit buffered data packets to the LADN.

10. The electronic device of claim 9, wherein the first processor is configured to set a condition for terminating the buffering of data packets for the uplink transmission.

11. The electronic device of claim 10, wherein the first processor is configured to drop all buffered data packets after the set condition is met.

12. The electronic device of claim 10, wherein the set condition for ending the buffering includes at least one of:
a first condition in which the electronic device fails to reenter the geographic service area of the LADN within a prespecified time;
a second condition in which the electronic device is located outside a prespecified distance from the LADN; and
a third condition in which a count of the buffered data packets exceeds a prespecified value.

13. An electronic device, comprising:
at least one processor configured to perform wireless communication with a local area data network (LADN); and
a memory, electrically connected with the at least one processor, storing instructions executable by the at least one processor to cause the electronic device to:
generate data packets for uplink transmission with the LADN,
detect deactivation rather than released of a wireless communication session with the LADN,
wherein release includes release of radio resources and tunneling with the LADN, and removal information associated with the LADN, and
wherein deactivation includes release of radio resources and tunneling, and retaining of information associated with the LADN, detect whether the wireless communication session is deactivated because the electronic device has left a geographic service area of the LADN, wherein the wireless communication session is detected as deactivated according to whether a radio resource corresponding to the wireless communication session is released, when detecting that the wireless communication session is deactivated because electronic device has left the geographic service area, transmitting a message to another processor that the wireless communication session is released, whereas the wireless communication session is deactivated rather than released, to cause the another processor to terminate the generation of data packets for the uplink transmission,
wherein after the electronic device leaves the geographic service area of the LADN, the at least one processor stores in the memory at least any one of an address of the electronic device, a domain name server (DNS) address, and quality of service (QoS) information, and when detecting that deactivation is unrelated to the geographic service area and the electronic device remains in the geographic service area, continue generating the data packet for uplink transmission, transmit a service request to the LADN, and reactivate the wireless communication session for transmission of the generated data packet.

14. The electronic device of claim 13, wherein:
the at least one processor includes a first processor and a second processor,
the second processor generates the data packets, and
the first processor receives a first message from the LADN indicating that a wireless communication session with the LADN is deactivated after the electronic device leaves the geographic service area, and transmits a second message indicating that the wireless communication session is deactivated to the second processor.

15. The electronic device of claim 14, wherein the second processor terminates generation of the data packets for the uplink transmission after receiving the second message.

16. The electronic device of claim 14, wherein the first processor includes a communication processor, and
wherein the second processor includes an application processor.

* * * * *